United States Patent [19]

Georgoudis

[11] 4,124,571
[45] Nov. 7, 1978

[54] THERMOPLASTIC COPOLYESTERS PREPARED FROM AROMATIC DICARBOXYLIC ACID SUBSTITUTED SUCCINIC ACID OR ANHYDRIDE AND A GLYCOL AND THE USE THEREOF IN ADHESIVES

[75] Inventor: Paul C. Georgoudis, Dunellen, N.J.

[73] Assignee: National Starch and Chemical Corporation, Bridgewater, N.J.

[21] Appl. No.: 820,451

[22] Filed: Aug. 1, 1977

[51] Int. Cl.² .......................................... C08L 67/02
[52] U.S. Cl. ........................................ 260/16; 260/26; 260/860; 528/220; 528/291; 528/296; 528/300; 260/22 CQ; 528/304; 528/305; 528/303; 528/302; 528/273
[58] Field of Search ......... 260/26, 75 R, 860, 75 NK, 260/75 EP, 75 T

[56] References Cited

U.S. PATENT DOCUMENTS

| 3,329,740 | 7/1967 | Battersby | 260/860 |
|---|---|---|---|
| 3,383,343 | 5/1968 | Mohajer et al. | 260/22 |
| 3,390,108 | 6/1968 | Keck et al. | 260/7.5 |
| 3,542,737 | 11/1970 | Keck et al. | 260/75 R |
| 3,954,841 | 5/1976 | Stackman | 260/75 EP |
| 3,959,062 | 5/1976 | Hoh et al. | 260/26 |
| 3,975,323 | 8/1976 | Georgoudis et al. | 260/75 UA |

FOREIGN PATENT DOCUMENTS 1,398,551  3/1965  France ................................ 260/75 R Primary Examiner—M. J. Welsh
Attorney, Agent, or Firm—James & Franklin

[57] ABSTRACT

A thermoplastic copolyester is formed of at least one aromatic dicarboxylic acid member, at least one aliphatic dicarboxylic acid member (an alkyl- or alkenyl-substituted succinic acid or anhydride thereof), and at least one $C_2$–$C_{10}$ glycol. Particularly preferred copolyesters are those wherein at least one non-polymeric polyfunctional member is added to the base copolyester composition to function as a chain-extender therefor. The resultant copolyester is useful as an adhesive both by itself and as an ingredient of hot melt or solution adhesive formulations.

15 Claims, No Drawings

THERMOPLASTIC COPOLYESTERS PREPARED FROM AROMATIC DICARBOXYLIC ACID SUBSTITUTED SUCCINIC ACID OR ANHYDRIDE AND A GLYCOL AND THE USE THEREOF IN ADHESIVES

BACKGROUND OF THE INVENTION

I. Field of the Invention:

This invention relates to novel thermoplastic copolyesters and adhesive compositions formed therefrom.

II. Brief Description of Prior Art:

In the case of solution adhesives, it is necessary that the adhesives be applicable to a substrate from a solution, and, in the case of hot melt adhesives, that the adhesives have high thermal or heat stability at elevated temperatures (i.e. the ability to resist degradation or gelation at high temperatures over time). Both types of adhesives require good wetting characteristics for good adhesion and low viscosity for ease of application. Hot melt and solution adhesives in general should also be characterized by high heat resistance or heat distortion temperature (i.e. the ability to form an adhesive bond which withstands high temperatures without softening or losing adhesion and adherence), and cold resistance (i.e. the ability to form a flexible adhesive bond which withstands low temperatures without becoming brittle), good cohesive strength, color (preferably clear or light), and compatibility with a large variety of tackifying resins, plasticizers, solvents, modifiers, pigments and the like.

In formulating such adhesives, it has been found that good low temperature properties are usually associated with polymers having a low glass transition temperature, high heat resistance with crystalline or semi-crystalline polymers, and good cohesive strength with both high molecular weight polymers and crystalline or semi-crystalline polymers.

In selecting copolyesters for use in adhesive formulations it is further desired that such copolyesters be easily and economically prepared. In much of the conventional copolyester manufacturing operations, high temperatures (up to 300° C.), high vacuum (0.1–1.0 mm Hg) and long polycondensation times are required to obtain products exhibiting useful adhesive characteristics. Such extreme conditions do not always result in the best obtainable products, due to degradation reactions occurring during the polycondensation, and in addition increase the cost of manufacture.

Copolyesters of ethylene glycol, terephthalic acid and dimer acid as well as similar copolyesters have been known and used in specific adhesive formulations such as those described, for example, in U.S. Pat. Nos. 3,383,343; 3,390,108; 3,329,740; 3,975,323 and French Pat. No. 1,398,551.

Copolyesters have also been prepared from ethylene glycol, terephthalic acid and particular substituted succinic acids as described in U.S. Pat. No. 3,542,737. These copolyesters are prepared using polycondensation temperatures of 275° C., at which temperature succinic compositions tend to decompose (i.e. decarboxylate), thus causing chain termination and so lowering the molecular weight of the final copolyester. Moreover, the patent teaches the use of such percentages of the succinic constituent (i.e., 5–15 mole percent based on the moles of acid units in the copolyester) that, in actuality, the succinic constituent plays very little part in the overall reaction. Furthermore, the copolyesters prepared in accordance with the teachings of the patent are useful only as fibers, filaments or films and, due to the relatively short chain length between functional groups in the succinic components, have such a high rigidity in the backbone that they would not be thought useful in the production of adhesives requiring, for example, low glass transition temperatures.

It is an object of the present invention to provide a novel thermoplastic copolyester useful, alone or in combination with typical adhesive formulations, as an adhesive composition.

It is a further object to provide an adhesive exhibiting good thermal stability, high heat and cold resistance, good wetting characteristics, low viscosity, good cohesive strength and a high compatibility with a large variety of tackifying resins, plasticizers, solvents, modifiers, pigments, etc.

Another object is to provide a thermoplastic copolyester which may further be cured through functional groups (e.g., hydroxyl or carboxyl groups) to improve their strength, heat and solvent resistance.

It is also an object to provide a method for manufacturing such thermoplastic copolyesters wherein mild conditions involving temperatures no higher than 265° C., pressures 1–30 mm Hg and relatively short polycondensation times of 2–7 hours are employed.

SUMMARY OF THE INVENTION

It has now been found that the above and related objects of the present invention are provided by a copolyester of at least one aromatic dicarboxylic acid member, at least one aliphatic dicarboxylic acid member and at least one $C_2$–$C_{10}$ glycol, wherein the total dicarboxylic acid members are composed of 20–80 mole percent in the aromatic dicarboxylic acid member and correspondingly 80–20 percent of the aliphatic dicarboxylic acid member. It has further been found that copolyesters characterized by superior performance are prepared when at least one non-polymeric polyfunctional member is added to the base copolyester composition to function as a chain-extender.

These copolyester compositions are prepared by combining the aromatic dicarboxylic acid member, the aliphatic dicarboxylic acid member and the glycol in a two or three stage process with the polycondensation reaction occurring at about 225°–265° C. for 2–7 hours at a pressure of about 1–30 mm Hg as will be described hereinbelow.

The resultant thermoplastic copolyesters are characterized, in varying degrees depending upon the specific optional components present, by a low glass transition temperature (preferably less than 0° C.), a relatively high melting point, superior heat stability, as well as unusual compatibility with additives conventionally used in the production of adhesive formulations.

Thus, these thermoplastic copolyesters are useful by themselves as hot melt or solution adhesives or may be compounded with various additives to lend themselves either to pressure sensitive adhesive formulations useful for non-vinyl wall coverings, labels, decals and the like, or to non-pressure sensitive formulations useful as structural adhesives and for packaging, edge bonding and laminating paper, cloth, wood and other non-vinyl substrates.

For uses on vinyl substrates wherein plasticizer resistance is a critical factor, the compositions of the present invention cannot be employed without further treatment such as is described in my co-pending application Ser. No. 820,452 filed on even date herewith.

DETAILED DESCRIPTION OF THE PREFERRED EMBODIMENTS

The aromatic dicarboxylic acid member used in the production of the thermoplastic copolyesters of the present invention is an aromatic dicarboxylic acid or an acid functioning derivative thereof. Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—. The term "aromatic dicarboxylic acids and their acid functioning derivatives," as used herein, includes equivalents of aromatic dicarboxylic acids having two functional carboxyl groups which perform substantially like aromatic dicarboxylic acids in reaction with glycols and polyols in forming copolyesters. These equivalents include esters and ester-forming derivatives, such as acid halides and anhydrides. Representative aromatic dicarboxylic acids and their acid functioning derivatives include terephthalic, phthalic and isophthalic acids, dibenzoic acid, substituted dicarboxy compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. The symmetrical members of the class (e.g., terephthalic acid and dimethyl terephthalate) are preferred. Due to its low cost relative to other symmetrical members of the class and its ready availability in a relatively pure form, dimethyl terephthalate is a preferred member of the class. In determining the best aromatic dicarboxylic acid member for use in the copolyester, attention should be paid both to the symmetrical nature of the compound (to insure crystallinity within the copolyester) and to the melting point of the homopolymer of the member (to insure that the copolyester has a relatively high melting point).

The aliphatic dicarboxylic acid member of the copolyester is a substituted succinic acid or anhydride threof, the succinic acid having one or two alkyl or alkenyl $C_4$–$C_{36}$ group substituents, preferably only one. Preferred substituted succinic acid members are the $C_8$–$C_{18}$ alkyl or alkenyl substituted succinic acid, particularly n-octadecyl succinic acid, n-octenyl succinic acid, iso-octenyl succinic acid, iso-octadecenyl succinic acid as well as the corresponding anhydrides thereof. Non-substituted succinic acid and other aliphatic dicarboxylic acids (whether substituted or not), such as adipic, sebacic and azelaic acids, are inoperative in the present invention, although they may be used in small amounts, in addition to the aliphatic dicarboxylic acid member, to modify particular copolyester properties.

The total dicarboxylic acid members (i.e. both aromatic and aliphatic) are composed of 20–80 mole percent of the aromatic dicarboxylic acid member and correspondingly 80–20 percent of the aliphatic dicarboxylic acid member.

The glycol member of the copolyester has from 2 to 10 carbon atoms and may be 1,2-ethanediol (also called ethylene glycol), 1,4-butanediol, 1,6-hexanediol, diethylene glycol, triethylene glycol, tetraethylene glycol, 2,2-dimethyl-1,3-propanediol (also called neopentyl glycol), or the like, with a glycol whose homopolymer has a high melting point (such as 1,4-butanediol and 1,6-hexanediol) being preferred.

Glycols having more than ten carbon atoms including various polymerized glycols (such as those available from Union Carbide under the tradename CARBOWAX) are inoperative in the present invention, although they may be used in small amounts, in addition to the glycol member, to modify particular copolyester properties.

The precise proportions of the various members present in the copolyester of the present invention will vary according to the application intended for the copolyester. The aromatic dicarboxylic acid member combined with the glycol member provides heat resistance and strength; the aliphatic dicarboxylic acid member combined with the glycol member provides resilience, toughness, tack and cold resistance. The polymer melting point will vary particularly with the choice of the glycol and aromatic dicarboxylic acid members, as well as the ratio of the aromatic dicarboxylic acid/aliphatic dicarboxylic acid members. Where the glycol forms a relatively low melting polymer with the aromatic dicarboxylic acid member (for example, where 1,6-hexanediol is reacted with terephthalic acid), a higher ratio of the aromatic dicarboxylic acid/aliphatic dicarboxylic acid members is preferred. Where the glycol forms a relatively high melting polymer with the aromatic dicarboxylic acid member (for example, 1,4-butanediol and terephthalic acid), a lower ratio of aromatic dicarboxylic acid/aliphatic dicarboxylic acid members is preferred to retain resilience in the copolyester and minimize its brittleness.

The non-polymeric polyfunctional members present as chain extenders in the preferred compositions of the present invention are the non-polymeric polyols, polycarboxlyic acids and hydroxy acids having at least three functional hydroxyl and/or carboxyl groups. Also included are the substituted ester-forming derivatives thereof, wherein the substituent group does not disturb the preparation of the copolyester.

Typical of useful non-polymeric polyols are glycerol, trimethylolethane, trimethylolpropane, pentaerythritol, 1,2,3-tris-(hydroxymethyl)propane, xylitol, hexitol (mannitol, dulcitol, or sorbitol), gluclose, sucrose, inositol, quebrachitol, 1,2,2-tris-(hydroxymethyl)-propane, 3,3-bis-(hydroxymethyl)-butane-2-ol, triethyanolamine, di- and tri-glycerols, etc.

Typical non-polymeric polycarboxylic acids, useful primarily for their contribution towards improving the heat stability of the compositions, include trimellitic anhydride, pyromellitic dianhydride, tetrahydrofuran dianhydride, cis,cis,cis,cis-cyclopentane-1,2,3,4-tetracarboxylic acid, benzophenone tetracarboxylic acid or anhydride, aconitic acid, tricarballylic acid etc.

Typical hydroxy acids include malic acid, citric acid, tartaric acid, 3-hydroxyglutaric acid, mucic acid, trihydroxyglutaric acid, 4-beta-hydroxyethyl phthalic acid, glycinic acid, d-galactonic acid, 7,8,10-trihydroxypalmitic acid, 7,8,10-trihydroxystearic acid, etc.

When one of the optional components is employed in accordance with the preferred embodiment of the present invention, the amounts employed may range from about 0.1 to 6.0, preferably 0.3 to 3.0, mole percent of the total dicarboxylic acid members. In the copolyester compositions wherein more than one non-polymeric polyfunctional component is used, the total amount of such optional components will be within the above-described range. The precise amounts of the non-polymeric polyfunctional components employed will depend on the degree of functionality of the component, as well as the particular copolyester being prepared and care should be taken to avoid cross-linking. In general, the higher the concentration of the aliphatic dicarboxylic acid member in the copolyester, the higher the amount of non-polymeric polyfunctional component that can be tolerated.

The use of the optional non-polymeric polyfunctional components in the copolyester chain extends the copolyester formed by the aromatic dicarboxylic acid member, the aliphatic dicarboxylic acid member and the glycol member, producing a thermoplastic copolyester of relatively high molecular weight. The production of such a thermoplastic copolyester is unexpected in view of the teachings of the prior art with respect to alkyd manufacture wherein the inclusion of such polyfunctional components results in the production of thermoset products. A further advantage to the use of these polyfunctional components in the present invention is that it facilitates the economical manufacturing of the copolyester by permitting a thermoplastic copolyester of high molecular weight to be produced under very mild conditions; that is, temperatures of 225°–265° C., pressures of 1–30 mm Hg. and polycondensation periods of 2–7 hours. In the absence of such a chain-extending component, the resultant copolyesters will be limited in molecular weight and will be useful for only a limited number of adhesive applications, e.g., as solution adhesives or additives in conjunction with other adhesive formulations to improve particular properties of the adhesive formulations.

The copolyesters of the present invention are formed in the following manner. Typically in Stage I the ester form of the aromatic dicarboxylic acid member and an excess of the glycol member are reacted at elevated temperatures (140°–215° C.) in the presence of a catalyst until the theoretical yield of the condensation or ester interchange product liberated is distilled off (2–7 hours). To assure completion of the reaction, a large excess (up to 100%) of glycol is used in all cases and is later removed duing the polycondensation reaction. In Stage II, the desired quantity of aliphatic dicarboxylic acid member is added along with an entraining agent, such as toluene or xylene, and heating is continud under reflux at elevated temperatures (200°–230° C.) until the theoretical yield of water formed as a result of the condensation reaction of the aliphatic dicarboxlyic acid is distilled off and the Acid No. is not in excess of 1.0 (Mg KOH/g sample (2–7 hours). (Alternatively, Stages I and II may be combined by introducing the acid form of the aromatic dicarboxylic acid member, the glycol member and the aliphatic dicarboxylic acid member into the reaction vessel simultaneously and co-reacting them). After the water is distilled off, the polycondensation reaction (Stage III) is accomplished by gradually reducing the pressure of about 1–30 mm Hg., heating the ingredients to 225°–265° C. (preferably 250°–265° C.) and maintaining such conditions for about 2 to 7 hours until a viscous product is obtained. Any optional non-polymeric polyfunctional member employed is added during this stage in the reaction as addition at an earlier stage may undesirably raise the glass transition temperature, reduce crystallinity and even effect cross-linking. The product of this chain-extending reaction may be conveniently discharged from the reaction vessel into a silicone release coated container.

Various catalysts can be used in connection with the various reactions. For example, the first condensation reaction (i.e., the Stage I reaction of the aromatic dicarboxylic acid member and the glycol member) may be catalyzed by individual catalysts such as antimony trioxide, litharge, glycol soluble compounds of titanium or cobalt, zinc acetate, lead acetate, or manganese acetate, or by combination catalysts such as lead acetate/litharge or dibutyltin oxide/antimony trioxide, or by any of the other conventional polyesterification catalysts. Similarly, the second condensation reaction (i.e., the Stage II reaction of the first product and the remaining glycol with the aliphatic dicarboxylic acid member) may be catalyzed by the same or different catalysts.

To preclude possible oxidation of the products during manufacturing a nitrogen atmosphere may be employed. Antioxidants may also be added at various stages of the reaction, preferably a small amount in the initial mix and a larger amount being added shortly before discharge of product. The various tackifying resins, ultraviolet stabilizers, fillers and the like may be added in conventional quantities and according to conventional procedures, as desired. When used, the tackifying resin will be present in amounts up to 75%, preferably not more than 55%, by weight of the total adhesive composition including the tackifying resin. Useful fillers (extenders and pigments) include silica, barium sulfate, calcium carbonate and zinc oxide, and these can be used in amounts up to 50% by weight of the total adhesive composition including the filler. Various waxes, such as paraffin, microcrystalline and synthetic waxes, may also be included in these adhesives in amounts up to about 50% by weight of the total adhesive composition including wax.

The resultant copolyesters of the present invention exhibit a low glass transition temperature, $T_g$ (that is, the temperature at which the amorphous region of the crystalline polymer changes from a fluid to a glassy solid) and a high polymer melting point, $T_m$ (that is, the temperature at which crystals in the polymer begin to melt). These are significant properties for an adhesive as its heat resistance is generally a function of its polymer melting point and its cold resistance is generally a function of its polymer glass transition temperature. Thus, the preferred copolyesters of the present invention are tough, resilient, thermoplastic polymers having a glass transition temperature less than 0° C. and a polymer melting point up to about 180° C.

Moreover, the thermoplastic copolyesters thus formed exhibit low melt viscosity and good thermal stability, two important parameters for hot melt adhesives, as well as excellent wetting characteristics, good heat and cold resistance, good cohesive strength, light color and compatibility with a large variety of tackifying resins, plasticizers, waxes, solvents, modifiers, pigments, etc. Typical copolyesters of the present invention, depending upon the particular components present, have intrinsic viscosities of 0.5–0.8 and melt viscosities of 300,000 to 800,000 cps. at 165° C.

The copolyesters of the present invention may be cured with polyisocyanates, polyanhydrides, epoxides, and the like. Curing effects a cross-linking of the copolymers primarily through terminal hydroxyl and/or carboxyl groups. Curing usually increases the cohesive and adhesive strength, creep resistance, heat resistance and solvent resistance of the copolyester adhesive, and may also improve its adhesive to particular substrates provides that the glass transition temperature of the copolyester is low enough so that any increase therein due to cross-linking does not cause embrittlement of the copolyester. By way of contrast, curing of conventional copolyesters typically reduces their low temperature flexibility, causing embrittlement and accompanying loss of adhesive and cohesive properties. This is especially true of conventional copolyesters with high glass transition temperatures (close to room temperature and higher), because curing raises the glass transition temperature. A typical curing agent is the reeaction product of trimethylolpropane or trimethylolethane (1 mole) and tolylene diisocyanate (3 moles), this reaction product being available at 75 percent solids in ethyl acetate solvent from Trancoa Chemical Co. under the trade name TRANCOA 375B. Typically, 16 parts of such a curing solution are utilized per hundred parts copolyester (in the form of a 25 percent solution of the copolyester in toluene).

While many of the copolyesters of the present invention re useful by themselves and adhesives without being modified in any way, it is often advantageous and in some cases even necessary to blend in other components for particular adhesive applications. For example, tackifying resins will typically be incorporated into the copolyester composition, the particular tackifying resin and the quantity thereof being determined by the specific product desired and/or the application desired. Exemplary of such tackifying resins are the rosins and rosin esters (such as those available from Hercules Chemical Company under the trade name FORAL 85); the hydrocarbon resins (such as those available from Zeigler Chemical Co. under the trade name ZECOREX 711); the aromatic hydrocarbon resins including styrene polymers and copolymers (such as the low molecular weight polystyrene resins available from Hercules Chemical Co. under the trade names PICCOLASTIC A50 and KRISTALEX 3085) and α-methylstyrene/vinyltoluene resins (available from Hercules Chemical Co. under the trade name PICCOTEX 100); the courmarone-indene resins (such as those available from Neville Chemical Co. under the trade name NEVILLAC and from Hercules Powder Co. under the trade name PICCO-COUMARONE 410 and PICCOL); aromatic-aliphatic copolymers resins (such as those available from Velsicol Chemical Corp. under the trade name KLYRVEL); aromatic petroleum oils (such as the paraffinic-naphthenic oils available from Shell Chemical Co. under the trade name SHELLFLEX 683 and from Witco Chemical Co. under the trade name KAYDOL); the phenolic polymer and copolymer resins (such as the terpene-phenol resins available from Schenectady Chemical, Inc. under the trade name SP-560 and from Reichold Chemical Co. under the trade name NIREZ 2040), the terpene resins (such as those available from Reichold under the trade name NIREZ 1115), and the like. Additionally, various other modifiers including antioxidants (such as 4,4'-thiobis-(6-tertiary butyl metacresol) available from Monsanto Chemical Co. under the trade name SANTONOX R, tetrakis [methylene 3-(3' 5'-di-t-butyl-4'-hydroxyphenyl)propionate] methane available from Ciba-Geigy under the trade name IRGANOX 1010, and others available from Weston Chemical Company under the trade name PHOSPHITE), plasticizers (such as dioctyl phthalate), both oxidized and non-oxidized polyethylene waxes (such as those available from Petrolite Corp. under the trade names POLYWAX E-730 and POLYWAX 1,000), pigments (such as calcium carbonate, silicon dioxide, titanium dioxide, zinc oxide), modifiers (such as styrene/butadiene copolymers, styrene/isoprene copolymers, ethylene/vinyl acetate copolymers), inert fillers (such as barium sulfate), and materials to increase bonding speeds (such as the hydrogenated castor oil available from Baker Castor Oil Co. under the trade name CASTORWAX).

Exemplary of the efficacy of the products and processes of the present invention are the following examples in which all parts are by weight unless otherwise specified.

EXAMPLE I

This example illustrates preparation of the thermoplastic copolyesters of the present invention.

Stage I. In a 2-liter, round-bottom pyrex flask equipped with stainless steel stirrer, thermometer, nitrogen inlet, 18 inch Vigreux column, 20 ml distillation receiver and condenser, there were introduced 388.0 parts dimethyl terephthalate, 401.2 parts 1,6-hexanediol, 0.50 parts dibutyltin oxide, 0.20 parts antimony trioxide and 0.40 parts 4,4'-thiobis-(6-tertiary butyl meta cresol). Reactions were heated with stirring to 136–230° C. for 2.5 hours until 125.6 parts methanol was distilled off and discarded.

Stage II. 210.0 Parts octenyl succinic anhydride and 86.0 parts xylene were introduced into the reacton and heated with stirring for 3 hours under reflux at 188°–211° C. until 40 parts water were distilled off and acid number equaled 0.33.

Stage III. The water of esterification and xylene in the distillation receiver were discarded. The Vigreux column was removed and the copolyester prepolymer was then poly-condensed under reduced pressure of 0.5–20 mm Hg and temperature of 255°–265° C. for 4.0 hours until a highly viscous product was obtained and discharged onto silicone release paper. On standing overnight (at room temperature) the product crystallized into a gray nontacky solid and had the following properties.

I.V. dl/g = 0.55
Tg° C. = − 37
Tm° C. = + 45, + 88

In this example, as well as those which follow, the I.V. (Intrinsic Viscosity) was determined using 0.5, 1.0 and 1.5% solution in 60/40 phenol 1,1,2,2-tetrachloroethane solvent and extrapolating to 0 concentration on a nsp/C vs concentration plot according to known methods. The values for Tg and Tm were determined on a DuPont model 900 Differential Thermal Analyzer.

EXAMPLE II

This example illustrates the use fo copolyesters of the present invention as solution adhesives. 30 Parts of the product from example I were dissolved in 90 parts 50:50 methylene chloride:toluene to which 6.0 parts of Trancoa 375B (75% in ethyl acetate solvent), a polyisocyanate from Trancoa Chemical Co., were added. The mixture was deposited on a 1 mil thick film of Mylar by means of a stainless steel wire wound rod to provide 3 mils (dry) thick film. After removal of the solvent by evaporation the coated Mylar specimens were laminated to 1 mil aluminum foil and aged overnight at room temprature R.T. The specimens were tested for initial and aged (one week at room temperature) peel or bond strength. Results were as follows:
Initial = 230 g./linear inch
Aged = 400 g./linear inch

EXAMPLE III

This example illustrates the preparation of chain-extended thermoplastic copolyesters in accordance with a preferred embodiment of the present invention.

291.0 Parts dimethyl terephthalate, 360 parts 1,4-butanediol, 0.51 parts dibutyltin oxide, 0.20 parts antimony trioxide and 0.41 parts 4,4'-thiobis-(6-tertiary butyl meta cresol) were charged into a 2-liter flask and reacted according to the procedure described in Example I (Stage I). After the theoretical amount of methanol was distilled off, 388.0 parts iso-octadecenyl succinic anhydride, 86.0 parts xylene and 5.64 pats trimethylol propane were added to the reactor and reacted according to the procedure described in Example I (Stage II) until acid number equalled No. 0.50. Thereafter, the copolyester prepolymer was polycondensed at 188°–265° C. and 1.5–2.0 mm Hg until a highly viscous product was obtained and discharged into silicon release paper. This product, which was also crystalline, had the following properties:
I.V., dl/g. = 0.75
$Tg° C. = -33$
$Tm° C. = +90, +128$

EXAMPLE IV

This example illustrates the utility of copolyesters of the present invention as hot melt adhesives for laminating wood.

50 Parts of copolyester from Example III and 50 parts Picco-L 60 (Hercules Chemical Co.) were blended at 300° F. until a uniform solution was obtained. A small amount of the molten adhesive composition was applied at about 300° F. on a 1 × 3 × ⅛ inch yellow birch splint with a 1 inch square measured off at one end. The composition being drawn down from the 1 inch line to the end of the splint. A second split was quickly placed on top of the first one making a bond of 1 square inch. A 500 gram weight was then placed over the laminate and hard manual pressure applied against the weight (and hence against the laminate) for 5 seconds. When set, excessive adhesive was trimmed off and the laminate was aged for 24 hours at room temperature. The shear strength was measured on an Instron Tester having a cross head speed of 12 inches per minute (this being the speed at which the adhesive bond is pulled apart), a chart speed of 12 inches per minute and a range of 0–1000 lbs. per square inch. The shear strength was determined to 740 lbs. per square inch.

EXAMPLE V

This example illustrates the preparation of a chain-extended thermoplastic copolyester polycondensed with both a non-polymeric polyol and polycarboxylic anhydride in accordance with a preferred embodiment of the present invention.

Dimethyl terephthalate 388 parts, 1,4-butanediol 360 parts, dibutyltin oxide 0.47 parts, antimony trioxide 0.19 parts and 4,4'-thiobis-(6-tertiary butyl meta cresol) were reacted according to the procedure of Example I, Stage I. Thereafter, 185.0 parts iso-octadecenyl succinic anhydride and 86 parts xylene were added to the reactor and reacted to an acid number of 0.6 according to Example I, Stage II. Thereafter 5.0 parts trimethylol propane, 6.0 parts trimellitic anhydride were added to the reactor and reactants were polycondensed to 260° C. and 1–5 mm Hg until a highly viscous product was obtained. and discharged into silicone release paper. After cooling overnight at room temperature, the copolyester had the following properties:
I.V. dl/g. = 0.72
$Tg° C. = -24$
$Tm° C. = +48, +155$

EXAMPLE VI

This example illustrates the use of copolyesters of the present invention which are suitable as adhesives without any further modification, i.e. without curing or blending with other ingredients.

The copolyester from Example V was tested as an automotive filter adhesive by applying in molten form at 400° F. to the die-cut paper used in sealing the paper element of an automotive filter. The copolyester exhibited the necessary resistance to hot motor oil and evidenced by adhesive bonds made therewith remaining unaffected after immersion of 3 days in hot motor oil (250° F.). No swelling, softening or degradation of the adhesive or any weakening of the adhesive bond was observed.

The preferred embodiments of the present invention having been described above, various modifications and improvements thereon will now become readily apparent to those skilled in the art. Accordingly, the spirit and scope of the present invention is defined not by the foregoing disclosure, but only the appended claims.

I claim:
1. A thermoplastic copolymer of
A. at least one aromatic dicarboxylic acid member selected from the group consisting of aromatic dicarboxylic acids and the acid functioning derivatives thereof;
B. at least one aliphatic dicarboxylic acid member selected from the group consisting of substituted succinic acids and the anhydrides thereof, said succinic acids having alkyl or alkenyl $C_4$–$C_{36}$ group substituents;
C. at least one $C_2$–$C_{10}$ glycol;
wherin said aromatic and aliphatic dicarboxylic acid members each comprise 20–80 mole percent of the total dicarboxylic acid members; and optionally
D. a non-polymeric polyfunctional member selected from the group consisting of non-polymeric polyols, polycarboxylic acids and hydroxy acids having at least three functional hydroxyl or carboxyl groups and the substituted ester-forming-derivatives thereof.

2. The copolyester of claim 1, wherein said aromatic dicarboxylic acid member is symmetrical.

3. The copolyester of claim 2 wherein said aromatic dicarboxylic acid member is selected from the group consisting of terephthalic acid and dimethyl terephthalate.

4. The copolyester of claim 1, wherein said glycol is selected from the group consisting of 1,4-butane diol, 1,6-hexanediol and triethylene glycol.

5. The copolyester of claim 1, wherein said succinic acid substituent is an alkyl group.

6. The copolyester of claim 1, wherein said succinic acid substituent is an alkenyl group.

7. The copolyester of claim 1, wherein said optional non-polymeric polyfunctional member is present in an amount of from about 0.1 to about 6 mole percent of the total dicarboxylic acid members in said copolyester.

8. The copolyester of claim 1 wherein the optional non-polymeric polyfunctional member is a non-polymeric polyol selected from the group consisting of glycerol, trimethylolethane, trimethylolpropane, pentaerythritol, 1,2,3-tris-(hydroxymethyl)propane, xylitol, mannitol, dulcitol, or sorbitol, glucose, sucrose, inositol, quebrachitol, 1,2,2-tris-(hydroxymethyl)-propane, 3,3-bis-(hydroxymethyl)-butane-2-ol, triethanolamine, di- and tri-glycerols.

9. The copolyester of claim 1 wherein the optional non-polymeric polyfunctional member is a non-polymeric polycarboxylic acid selected from the group consisting of trimellitic anhydride, pyromellitic dianhydride, tetrahydrofuran dianhydride, cis,cis,cis,cis-cyclopentane-1,2,3,4-tetracarboxylic acid, benzophenone tetracarboxylic acid or anhydride, aconitic acid and tricarballylic acid.

10. The copolyester of claim 1, wherein the optional non-polymer polyfunctional member is a hydroxy acid selected from the group consisting of malic acid, citric acid, tartaric acid, 3-hydroxyglutaric acid, mucic acid, trihydroxyglutaric acid, 4-beta-hydroxyethyl phthalic acid, glycinic acid, d-galactonic acid, 7,8,10-trihydroxypalmitic acid and 7,8,10-trihydroxystearic acid.

11. The copolyester of claim 1 characterized by a glass transition temperature less than 0° C. and a polymer melting point up to about 180° C.

12. A method of preparing a thermoplastic copolyester comprising the steps of
A. forming an intermediate copolyester of
  (i) at least one aromatic dicarboxylic acid member selected from the group consisting of aromatic dicarboxylic acids and the acid-functioning derivatives thereof,
  (ii) at least one aliphatic dicarboxylic acid member selected from the group consisting of substituted succinic acids and the anhydrides thereof, said succinic acids having alkyl or alkenyl $C_4$-$C_{36}$ group substituents, and
  (iii) at least one $C_2$-$C_{10}$ glycol;
wherein said aromatic and aliphatic dicarboxylic acid members each comprise 20–80 mole percent of the total dicarboxylic acid members, and
B. chain-extending said intermediate copolyester by reacting said intermediate copolyester at 255–265° C. at pressure of 1–30 mm Hg for about 2–7 hours, said chain-extension reaction occurring optionally in the presence of a non-polymeric polyfunctional member selected from the group consisting of non-polymeric polyols, polycarboxylic acids and hydroxy acids having at least three functional hydroxyl or carboxyl groups and the substituted ester-forming-derivatives thereof.

13. The method of claim 12, wherein said optional non-polymeric polyfunctional member is present in an amount of from about 0.1 to about 6 mole percent of the total dicarboxylic acid members in said copolyester.

14. An adhesive composition comprising a mixture of
A. the copolyester of claim 1, and
B. a tackifying resin in an amount up to 75% by weight of the total adhesive composition including the tackifying resin.

15. An adhesive composition comprising a mixture of
A. the reaction product of the copolyester of claim 1 and a curing agent selected from the group consisting of polyisocyanates, polyanhydrides, and epoxides, and
B. a tackifying resin in an amount up to 75% by weight of the total adhesive composition including the tackifying resin.

* * * * *